(12) United States Patent
Ueki

(10) Patent No.: US 11,829,828 B2
(45) Date of Patent: Nov. 28, 2023

(54) RFID TAG AND RFID TAGGED ARTICLE

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 365 days.

(21) Appl. No.: 17/355,734

(22) Filed: Jun. 23, 2021

(65) Prior Publication Data

US 2021/0319277 A1 Oct. 14, 2021

Related U.S. Application Data

(63) Continuation of application No. PCT/JP2020/032328, filed on Aug. 27, 2020.

(30) Foreign Application Priority Data

Dec. 4, 2019 (JP) .................................. 2019-219656

(51) Int. Cl.
*G06K 19/077* (2006.01)
*H01Q 1/22* (2006.01)
(Continued)

(52) U.S. Cl.
CPC ... *G06K 19/07756* (2013.01); *G06K 19/0723* (2013.01); *H01Q 1/2225* (2013.01);
(Continued)

(58) Field of Classification Search
CPC ......... G06K 19/0726; G06K 19/07749; G06K 19/07783; G06K 19/07786;
(Continued)

(56) References Cited

U.S. PATENT DOCUMENTS

2012/0098664 A1  4/2012  Nordin et al.
2012/0268251 A1* 10/2012  Chen ................ G06K 19/07786
340/10.1
(Continued)

FOREIGN PATENT DOCUMENTS

| JP | 2004326494 A | 11/2004 |
|---|---|---|
| JP | 2013546061 A | 12/2013 |
| WO | 2018092583 A1 | 5/2018 |

OTHER PUBLICATIONS

International Search Report issued for PCT/JP2020/032328, dated Nov. 10, 2020.

*Primary Examiner* — Vibol Tan
(74) *Attorney, Agent, or Firm* — ArentFox Schiff LLP

(57) ABSTRACT

An RFID tag is provided that includes a first planar conductor having a first opening, a second planar conductor partially or entirely facing the first planar conductor and having a second opening, an RFIC, a capacitor, and an inductor. The RFIC, the capacitor, and the inductor form a part of a current closed loop. Moreover, the first opening and the second opening have sizes that do not come into contact with a metal screw inserted into the first opening and the second opening. The first opening is located closer to a center than to an edge of the first planar conductor, and the second opening is located closer to a center than to an edge of the second planar conductor.

20 Claims, 17 Drawing Sheets

(51) Int. Cl.
*G06K 19/07* (2006.01)
*H01Q 7/00* (2006.01)

(52) U.S. Cl.
CPC ......... *H01Q 7/00* (2013.01); *G06K 19/07758* (2013.01); *G06K 19/07786* (2013.01)

(58) Field of Classification Search
CPC ......... G06K 19/07775; G06K 7/10336; G06K 19/07756; G06K 7/086; G06K 19/0723; G06K 19/07758; H01Q 1/2225; H01Q 7/00

See application file for complete search history.

(56) References Cited

U.S. PATENT DOCUMENTS

| | | | |
|---|---|---|---|
| 2013/0214989 A1* | 8/2013 | Farley | G06K 7/10316 343/893 |
| 2014/0091138 A1 | 4/2014 | Nordin et al. | |
| 2014/0374479 A1 | 12/2014 | Nordin et al. | |
| 2019/0228283 A1 | 7/2019 | Eshima et al. | |

* cited by examiner

Fig.11
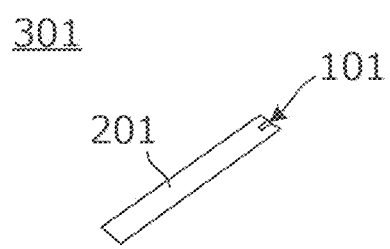
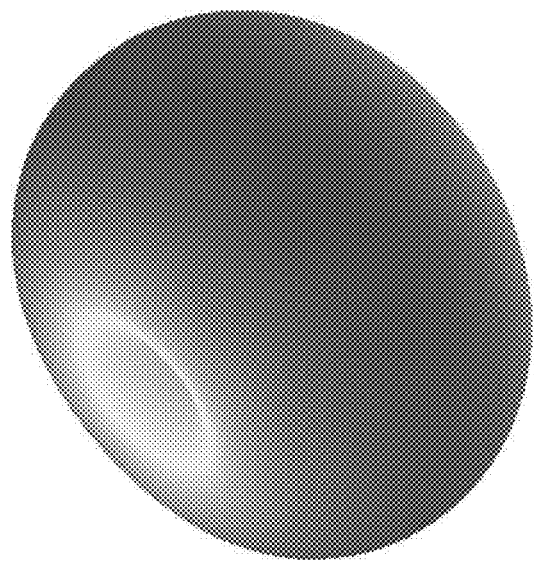

Fig.12
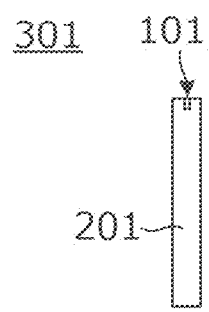
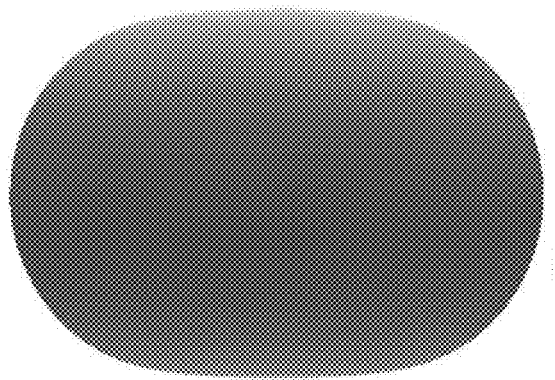

RFID TAG AND RFID TAGGED ARTICLE

CROSS REFERENCE TO RELATED APPLICATIONS

The present application is a continuation of PCT/JP2020/032328 filed Aug. 27, 2020, which claims priority to Japanese Patent Application No. 2019-219656, filed Dec. 4, 2019, the entire contents of each of which are incorporated herein by reference.

TECHNICAL FIELD

The present invention relates to an RFID tag attached to an article, and an RFID tagged article including the article and the RFID tag.

BACKGROUND

WO 2018/092583 A (hereinafter "Patent Literature 1") discloses an RFID tag attached to a metal article. The RFID tag includes an RFIC and a loop electrode connected to the RFIC. The loop electrode includes a flat plate electrode, a metal pin, and a conductor pattern.

Moreover, the RFID tag is adhered to a surface of the article using, for example, an adhesive. As a result, an RFID tagged article is formed.

With the RFID tagged article described in Patent Literature 1, when the RFID tag is adhered to the article using an adhesive, there is a risk that the RFID tag may fall off relatively easily depending on an environment (e.g., external factor) such as ambient atmosphere, liquid quality, temperature change, or impact. For example, small steel articles such as medical instruments are exposed to a high-temperature environment during sterilization treatment. In such a high temperature environment, a volatile chemical substance (e.g., a released gas) called an outgas might be released from the adhesive, and thus there is a problem in that the structure of the RFID tagged article is not suitable for making an RFID tagged medical instrument or the like.

SUMMARY OF THE INVENTION

In view of the above, an object of the exemplary embodiments is to provide an RFID tag and an RFID tagged article that feature high environmental resistance and is free of gas emission.

An RFID tag according to an exemplary embodiment includes a first planar conductor having a first opening; a second planar conductor partially or entirely facing the first planar conductor and having a second opening; an RFIC; a capacitor having a first connection end and a second connection end; and an inductor having a first connection end and a second connection end. Moreover, the RFIC, the capacitor, and the inductor form a part of a current closed loop. The first opening and the second opening have sizes that do not come into contact with a metal fastener inserted into the first opening and the second opening, and the first opening is located closer to a center than to an edge of the first planar conductor, and the second opening is located closer to a center than to an edge of the second planar conductor.

Moreover, an RFID tagged article according to an exemplary embodiment includes an RFID tag and an article to which the RFID tag is fixed. The RFID tag includes a first planar conductor having a first opening; a second planar conductor partially or entirely facing the first planar conductor and having a second opening; an RFIC; a capacitor having a first connection end and a second connection end; and an inductor having a first connection end and a second connection end. The RFIC, the capacitor, and the inductor form a part of a current closed loop. Moreover, the first opening and the second opening have sizes that do not come into contact with a metal fastener inserted into the first opening and the second opening, and the first opening is located closer to a center than to an edge of the first planar conductor, and the second opening is located closer to a center than to an edge of the second planar conductor. The RFID tag is attached to the article using the metal fastener inserted into the first opening and the second opening of the RFID tag.

According to the exemplary embodiments of the present invention, an RFID tag and an RFID tagged article are provided that feature high environmental resistance and are free of gas emission.

BRIEF DESCRIPTION OF DRAWINGS

FIG. 11 is a diagram illustrating directivity of radio waves radiated from the RFID tagged article 301.

FIG. 12 is a diagram illustrating directivity of radio waves radiated from the RFID tagged article 301.

DETAILED DESCRIPTION OF EMBODIMENTS

Figure 1:
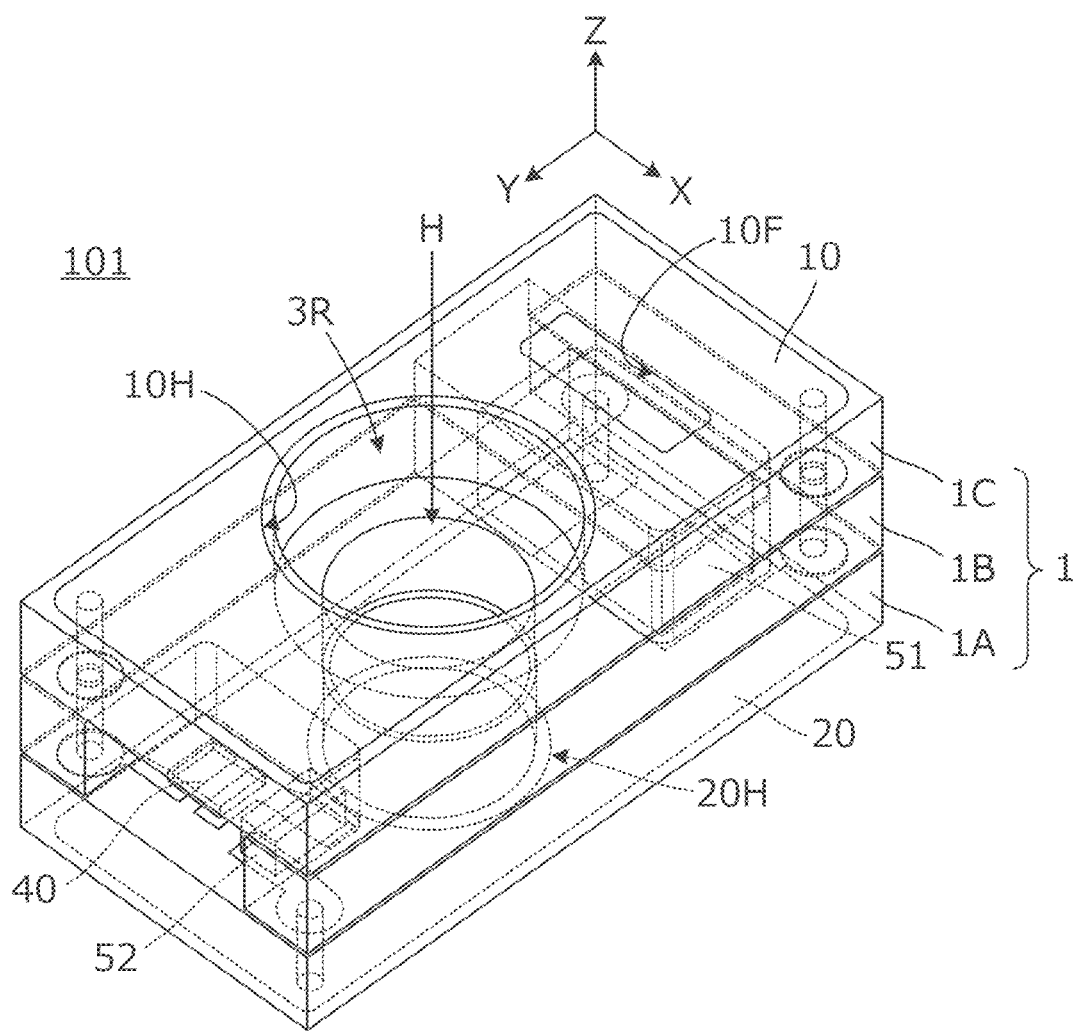
FIG. 1 is a perspective view of an RFID tag 101 according to a first exemplary embodiment.

Hereinafter, a plurality of exemplary embodiments are disclosed with specific examples with reference to the drawings. In each drawing, the same parts are designated by the same reference numerals. Although embodiments are described separately, for convenience, in consideration of the description of main points or the ease of understanding, configurations described in different embodiments can be partially replaced or combined. In second and subsequent embodiments, a description of matters common to a first embodiment will be omitted, and only different points will be described. In particular, similar effects obtained by a similar configuration will not be sequentially described for each embodiment.

First Exemplary Embodiment

Figure 2:
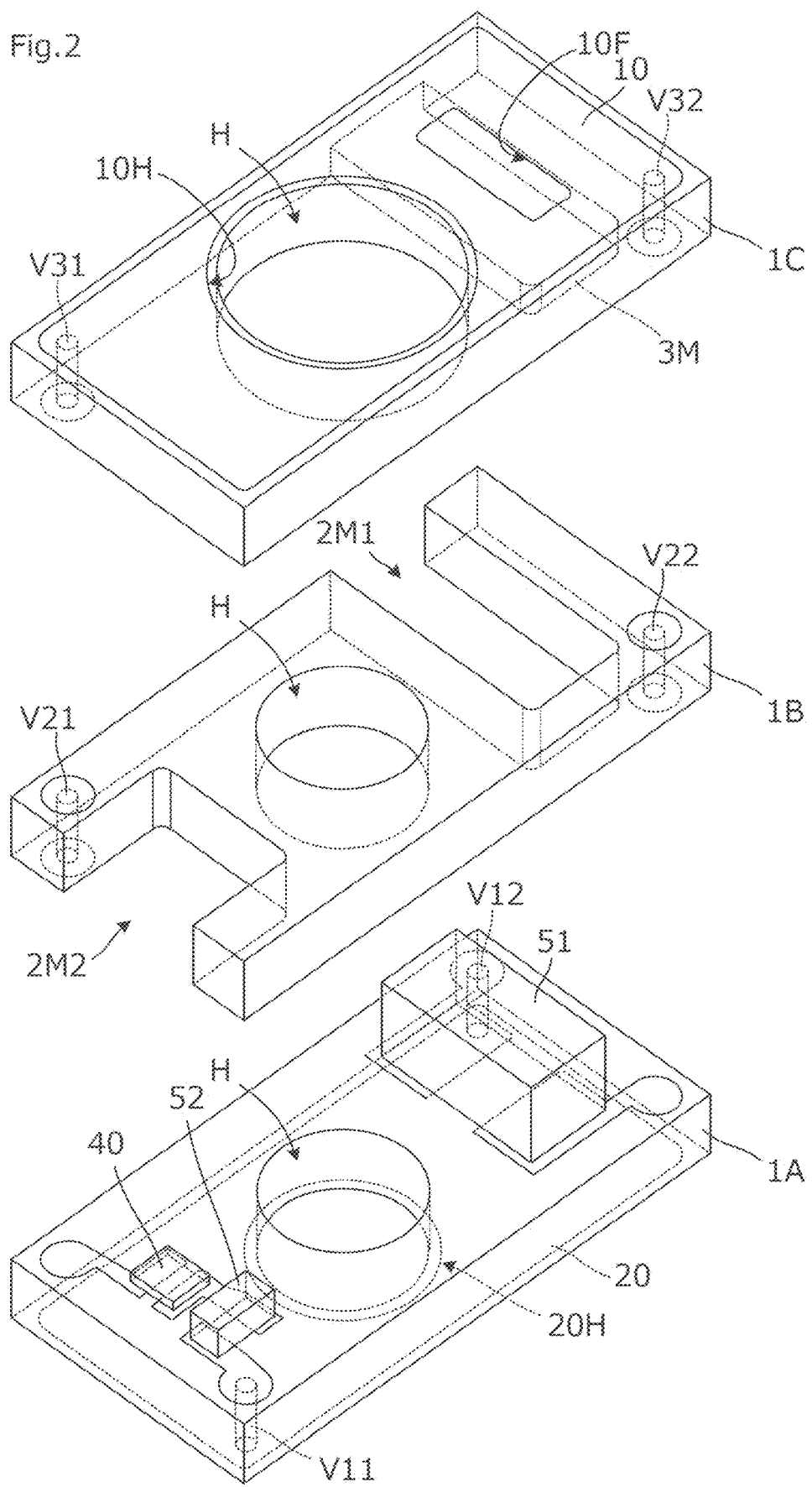
FIG. 2 is an exploded perspective view of a main part of the RFID tag 101.

FIG. 1 is a perspective view of an RFID tag 101 according to a first embodiment, and FIG. 2 is an exploded perspective view of a main part of the RFID tag 101.

As shown, the RFID tag 101 includes a first planar conductor 10 having a first opening 10H, a second planar conductor partially or entirely facing the first planar conductor 10 and having a second opening 20H, an RFIC 40, a capacitor 52, and an inductor 51. The first planar conductor 10 and the second planar conductor 20 are supported by an insulating base material 1. Moreover, the insulating base material 1 is a laminate of a first 1A, a second insulating base material 1B, and a third insulating base material 1C. These insulating base materials 1A, 1B, and 1C are, for example, glass/epoxy substrates, thermosetting resin base materials, such as BT resins, ceramic base materials, and the like.

For example, the height of the RFID tag 101 is 2 mm, and one side and the other side of the bottom surface of the RFID tag 101 are respectively 2.5 mm and 5 mm long according to an exemplary aspect.

As described below, the RFIC 40, the capacitor 52, and the inductor 51 form a part of a current closed loop.

As illustrated in FIG. 2, the first planar conductor 10 is formed on the upper surface of the third insulating base material 1C. The second planar conductor 20 is formed on the lower surface of the first insulating base material 1A. The second insulating base material 1B is provided between the first insulating base material 1A and the third insulating base material 1C. As further shown, cylindrical openings H are formed at the center of the first insulating base material 1A, the second insulating base material 1B, and the third insulating base material 1C. As will be described below, a metal screw is inserted into these openings H.

In the second planar conductor 20 provided on the lower surface of the first insulating base material 1A, a second opening 20H is formed at a position corresponding to the opening H. As further shown, the second opening 20H is located closer to the center than to the edge (i.e., the side edge) of the second planar conductor 20. Electrodes on which the RFIC 40, the capacitor 52, and the inductor 51 are respectively mounted are formed on the upper surface of the first insulating base material 1A, and the RFIC 40, the capacitor 52, and the inductor 51 are mounted on these electrodes. According to an exemplary aspect, the capacitor 52 is a chip capacitor, and the inductor 51 is a chip inductor. Moreover, the electrode to which one end of the capacitor 52 is connected and the second planar conductor 20 are connected to each other via a via conductor V11. The electrode to which one end of the inductor 51 is connected and the second planar conductor 20 are connected to each other via a via conductor V12.

In the second insulating base material 1B, a space portion 2M1 is formed for avoiding interference (abutment) with the inductor 51. In the second insulating base material 1B, a space portion 2M2 is formed for avoiding interference (abutment) with the RFIC 40 and the capacitor 52. Further, via conductors V21 and V22 are formed in the second insulating base material 1B.

In the first planar conductor 10 provided on the upper surface of the third insulating base material 1C, a first opening 10H is formed at a position corresponding to the opening H. The first opening 10H is located closer to the center than to the edge (i.e., the side edge) of the first planar conductor 10. An opening 10F for releasing magnetic flux is formed in the first planar conductor 10. In the lower surface of the third insulating base material 1C, a space portion 3M is formed for avoiding interference (abutment) with the inductor 51. As further shown, via conductors V31 and V32 connected to the first planar conductor 10 are formed in the third insulating base material 1C.

The inductor 51 is a chip inductor that has a coil winding axis in the X direction illustrated in FIG. 1 and does not include a magnetic core. Therefore, when the opening 10F for releasing magnetic flux is not formed, the magnetic flux leaking to the outside of the inductor 51 hits the first planar conductor 10 to result in generation of an eddy current. In view of this, in the present embodiment, the opening 10F for releasing magnetic flux is formed, so that the generation of the eddy current is suppressed, whereby a decrease in inductance of the inductor 51 is suppressed.

Further according to the exemplary aspect, the first insulating base material 1A, the second insulating base material 1B, and the third insulating base material 1C illustrated in FIG. 2 are laminated and joined by soldering. Specifically, lower portions of the via conductors V21 and V22 of the second insulating base material 1B are soldered to the electrodes on the upper surface of the first insulating base material 1A, and upper portions of the via conductors V21 and V22 of the second insulating base material 1B are soldered to the lower portions of the via conductors V31 and V32 of the third insulating base material 1C.

Moreover, in one aspect, the gaps in the space portions 2M1, 2M2, and 3M may be filled with, for example, epoxy resin or the like. Furthermore, gaps between the insulating base materials 1A, 1B, and 1C may also be filled with, for example, an epoxy resin or the like.

Figure 3:
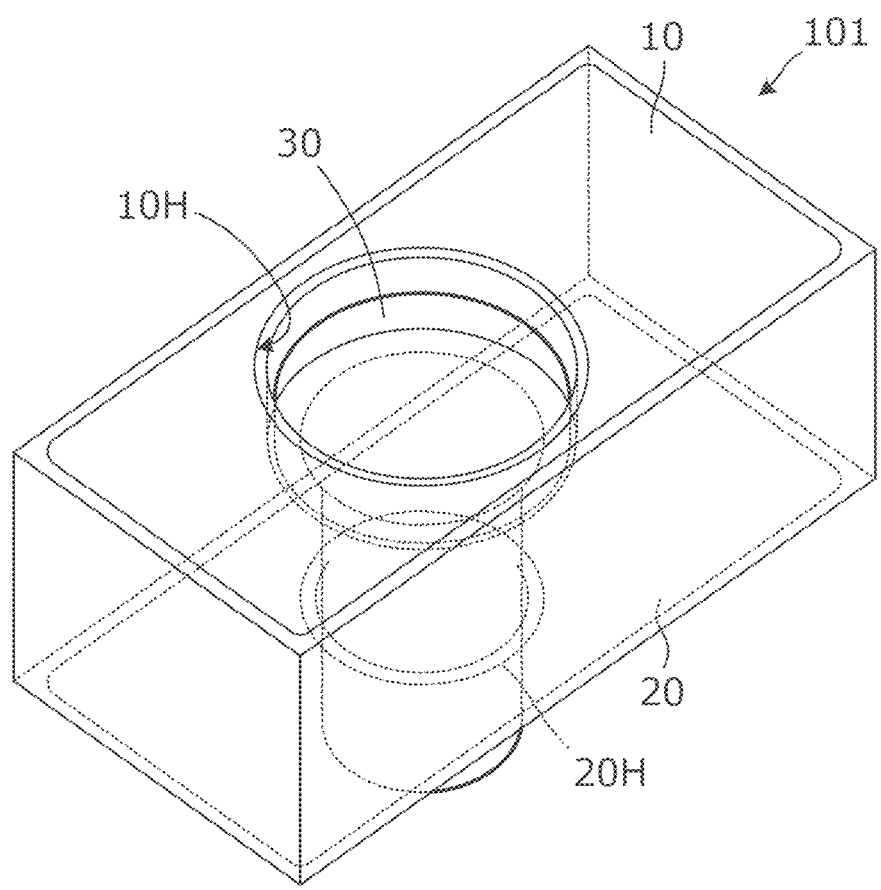
FIG. 3 is a perspective view illustrating a state where a metal screw 30 is inserted in an opening H of the RFID tag 101.
Figure 4:
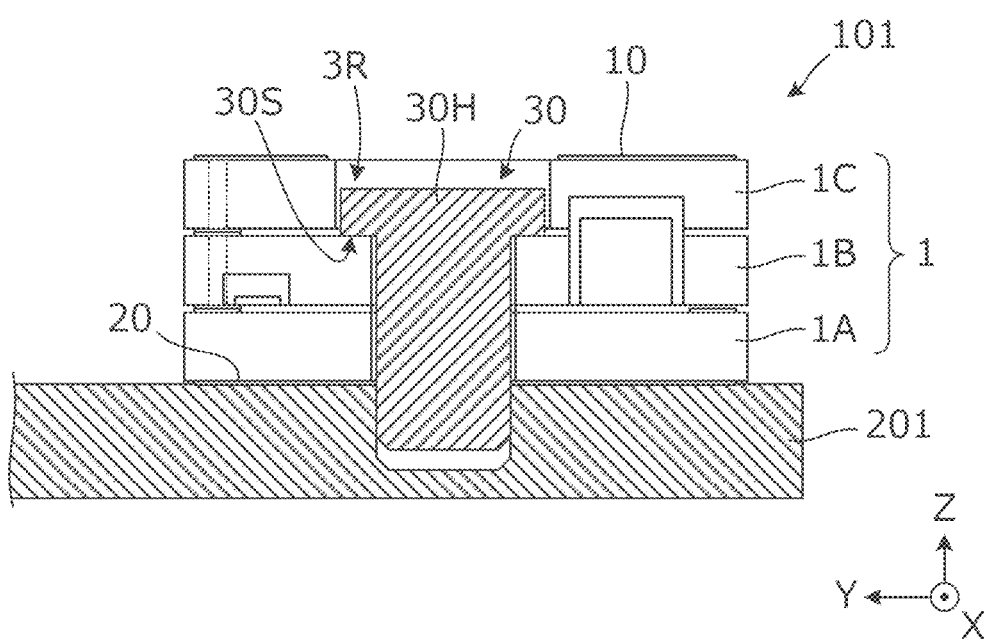
FIG. 4 is a cross-sectional view illustrating a state where the RFID tag 101 is attached to a metal article 201 using the metal screw 30.

FIG. 3 is a perspective view illustrating a state where a metal screw 30 is inserted in the opening H of the RFID tag 101. FIG. 4 is a cross-sectional view illustrating a state where the RFID tag 101 is attached to a metal article 201 using the metal screw 30. The metal screw 30 is, for example, an M1.2 micro screw. A head bearing surface 30S of the metal screw 30 comes into contact with the upper surface of the second insulating base material 1B. Thus, the laminated body made up of the first insulating base material 1A, the second insulating base material 1B, and the third insulating base material 1C has a recess 3R in which at least the head bearing surface 30S of the metal screw 30 is buried to be at a height lower than the first planar conductor 10.

Figure 5:
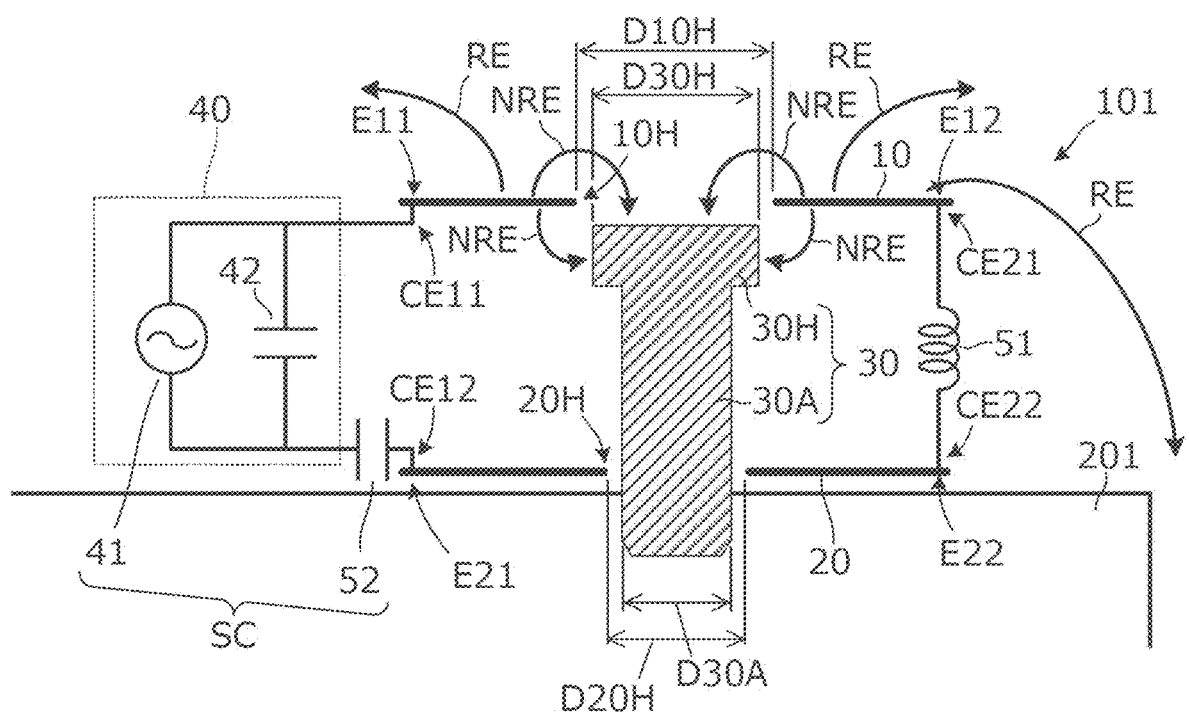
FIG. 5 is a circuit diagram of the RFID tag 101 according to the first exemplary embodiment.

FIG. 5 is a circuit diagram of the RFID tag 101 according to the first embodiment. In the present embodiment, the RFIC 40 and the capacitor 52 are connected in series without the first planar conductor 10 and the second planar conductor 20 provided in between, and form a series circuit SC having a first connection end CE11 and a second connection end CE12. The first connection end CE11 of the series circuit SC is connected to a first connection portion E11 of the first planar conductor 10. A first connection end CE21 of the inductor 51 is connected to a second connection portion E12 of the first planar conductor 10. The second connection end CE12 of the series circuit SC is connected to a first connection portion E21 of the second planar conductor 20. A second connection end CE22 of the inductor 51 is connected to a second connection portion E22 of the second planar conductor 20.

With this configuration, the RFIC 40, the capacitor 52, the first planar conductor 10, the inductor 51, and the second planar conductor 20 form a current closed loop. In the present embodiment, the RFIC 40 includes a communication circuit 41. A capacitor 42 represents an input impedance in the RFIC 40. The frequency of a communication signal processed by the RFIC 40 is, for example, in a 900 MHz band (860 MHz to 960 MHz).

In the exemplary aspect, the current closed loop forms an LC resonance circuit including the capacitor 52 and the inductor 51. Thus, the potential difference between the second planar conductor 20, which is a portion of connection between the capacitor 52 and the inductor 51, and the first planar conductor 10 to which the first connection end CE21 of the inductor 51 is connected is the largest at or around the resonance frequency. Thus, one of two portions with a large potential difference in the current closed loop is the first planar conductor 10, and the other one of the portion is the second planar conductor 20.

According to the exemplary aspect, an inner diameter D10H of the first opening 10H of the first planar conductor 10 is larger than an outer diameter D30H of the head of the metal screw 30. Moreover, an inner diameter D20H of the second opening 20H of the second planar conductor 20 is larger than a shaft diameter D30A of the metal screw 30. Thus, the first opening 10H and the second opening 20H are not in contact with metal screw 30 and are not electrically connected to each other.

FIG. 5 illustrates a radiation electric field RE radiated from the first planar conductor 10. As illustrated in FIG. 5, the first planar conductor 10 and the second planar conductor 20 facing each other with the insulating base materials 1A, 1B, and 1C interposed therebetween form a patch antenna-like structure, and the potentials applied to the first planar conductor 10 and the second planar conductor 20 have an inverse (inverted) relationship. With this configuration, the first planar conductor 10 and the second planar conductor 20 act as radiation sources of an antenna.

In FIG. 5, an electric field NRE that does not contribute to the radiation is generated between the first planar conductor 10 and the metal screw 30. Still, with a distance between the first opening 10H of the first planar conductor and a head 30H of the metal screw 30 set to be long and with a distance between the second opening 20H of the second planar conductor and a shaft 30A of the metal screw 30 also set to be long, the electric field NRE that does not contribute to the radiation can be reduced, whereby the degradation of the radiation performance of the RFID tag 101 due to the presence of the metal screw 30 can be suppressed.

Figure 6:
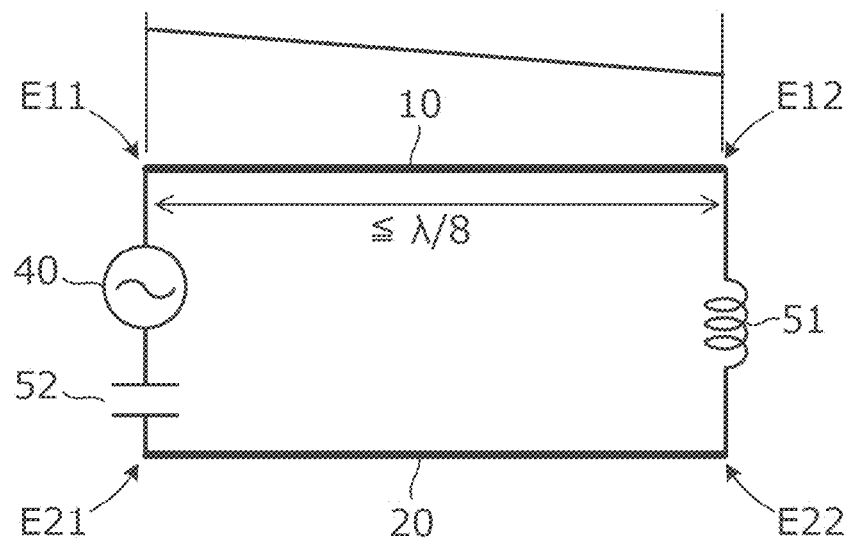
FIG. 6 is a view illustrating a conceptual gradient of electric field intensity on a first planar conductor 10 and a second planar conductor 20.

FIG. 6 is a view illustrating a conceptual gradient of electric field intensity on the first planar conductor 10 and the second planar conductor 20. It is noted that the first opening 10H and the second opening 20H is omitted in this drawing. In the RFID tag 101 of the present embodiment, the length of a current path from the first connection portion E11 of the first planar conductor 10 to the second connection portion E12 of the first planar conductor 10 is ⅛ wavelength or less at the frequency at which the first planar conductor 10 and the second planar conductor 20 act as radiation elements. The length of the current path from the first connection portion E21 of the second planar conductor 20 to the second connection portion E22 of the second planar conductor 20 is ⅛ wavelength or less at the frequency described above.

In FIG. 6, an inclined straight line represents a distribution of the electric field intensity on the current path from the first connection portion E11 of the first planar conductor 10 to the second connection portion E12 of the first planar conductor 10, or the electric field intensity on the current path from the first connection portion E21 of the second planar conductor 20 to the second connection portion E22 of the second planar conductor 20. Since the electrical length of the current path is ⅛ wavelength or less, the gradient of the electric field intensity on the current path is substantially constant.

Figure 7:
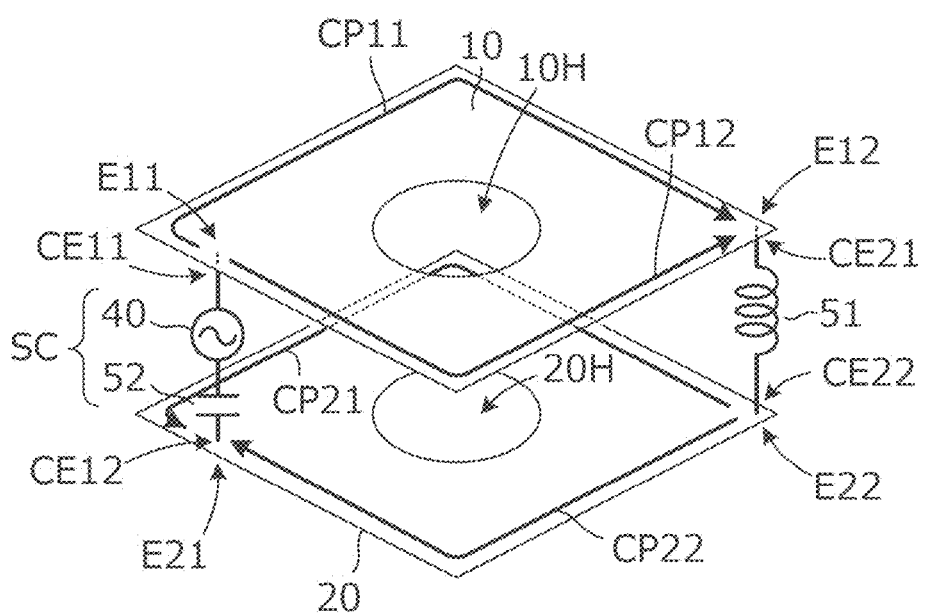
FIG. 7 is a stereoscopic circuit diagram of the RFID tag 101 according to the first exemplary embodiment.

FIG. 6 illustrates the first planar conductor and the second planar conductor as viewed in a direction parallel to the first planar conductor 10 and the second planar conductor 20, and this similarly applies to a three-dimensional representation. FIG. 7 is a stereoscopic circuit diagram of the RFID tag 101 according to the first embodiment. In the present embodiment, the first connection portion E11 of the first planar conductor 10 to which the first connection end CE11 of the series circuit SC including the RFIC 40 and the capacitor 52 is connected and the second connection portion E12 of the first planar conductor 10 to which the first connection end CE21 of the inductor 51 is connected are respectively located near sides of the first planar conductor 10 opposite to each other and located near corners opposite to each other. The first connection portion E21 of the second planar conductor 20 to which the second connection end CE12 of the series circuit SC is connected and the second connection portion E22 of the second planar conductor 20 to which the second connection end CE22 of the inductor 51 is connected are respectively located near sides of the second planar conductor 20 opposite to each other and located near corners opposite to each other.

For purposes of this disclosure, it is noted that the term "near side" indicates a position closer to a side of the planar conductor than to the center thereof, and the term "near corner" indicates a position closer to a corner of the planar conductor than to the center.

In an exemplary aspect, the first connection portion E11 and the second connection portion E12 of the first planar conductor 10 can be respectively located near sides of the first planar conductor 10 opposite to each other or can be respectively located near corners opposite to each other. Similarly, the first connection portion E21 and the second connection portion E22 of the second planar conductor 20 can be respectively located near sides of the second planar conductor 20 opposite to each other or may be respectively located near corners opposite to each other. Note that the first connection portion E11 and the second connection portion E12 of the first planar conductor 10 are in a positional relationship to be far from each other as much as possible. Similarly, the first connection portion E21 and the second connection portion E22 of the second planar conductor 20 are in a positional relationship to be far from each other as much as possible. For example, a line segment connecting the first connection portion E11 and the second connection portion E12 of the first planar conductor 10 preferably passes through the first opening 10H. Similarly, a line segment connecting the first connection portion E21 and the second connection portion E22 of the second planar conductor 20 preferably passes through the second opening 20H.

Current paths CP11 and CP12 from the first connection portion E11 to the second connection portion E12 of the first planar conductor 10 are each ⅛ wavelength or less. Current paths CP21 and CP22 from the first connection portion E21 to the second connection portion E22 of the second planar conductor 20 are each ⅛ wavelength or less.

Figure 8:
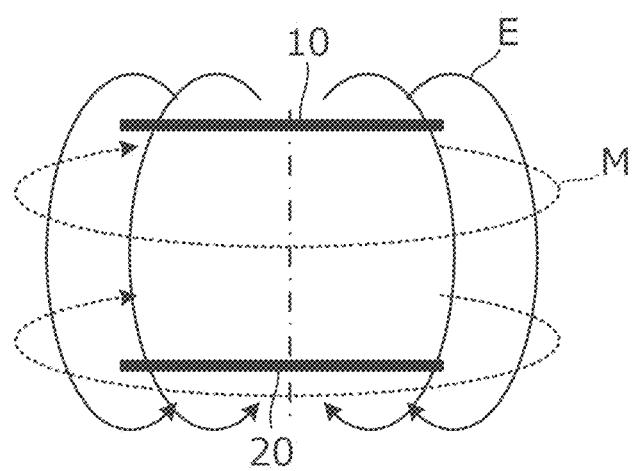
FIG. 8 is a diagram illustrating how a radiation electric field and a radiation magnetic field are generated from the first planar conductor 10 and the second planar conductor 20.

FIG. 8 is a diagram illustrating how a radiation electric field and a radiation magnetic field are generated from the first planar conductor 10 and the second planar conductor 20. As shown in FIG. 8, a solid line represents a radiation electric field E, and a broken line represents a radiation magnetic field M. As described above, the potential gradients of the first planar conductor 10 and the second planar conductor 20 are small, and thus the radiation electric field and the radiation magnetic field generated by the first planar conductor 10 and the second planar conductor 20 are rotationally symmetric about a line (one-dot chain line) connecting the center of the first planar conductor 10 and the center of the second planar conductor 20. Thus, the one-dot chain line corresponds to a node of the electromagnetic field. The metal screw 30 is inserted into such a node of the electromagnetic field, an impact of the metal screw 30 on the electromagnetic field radiation from the first planar conductor 10 and the second planar conductor 20 is small. In addition, the metal screw 30 extends in the direction of the electric field, and thus hardly affects the magnetic field.

Figure 9A:
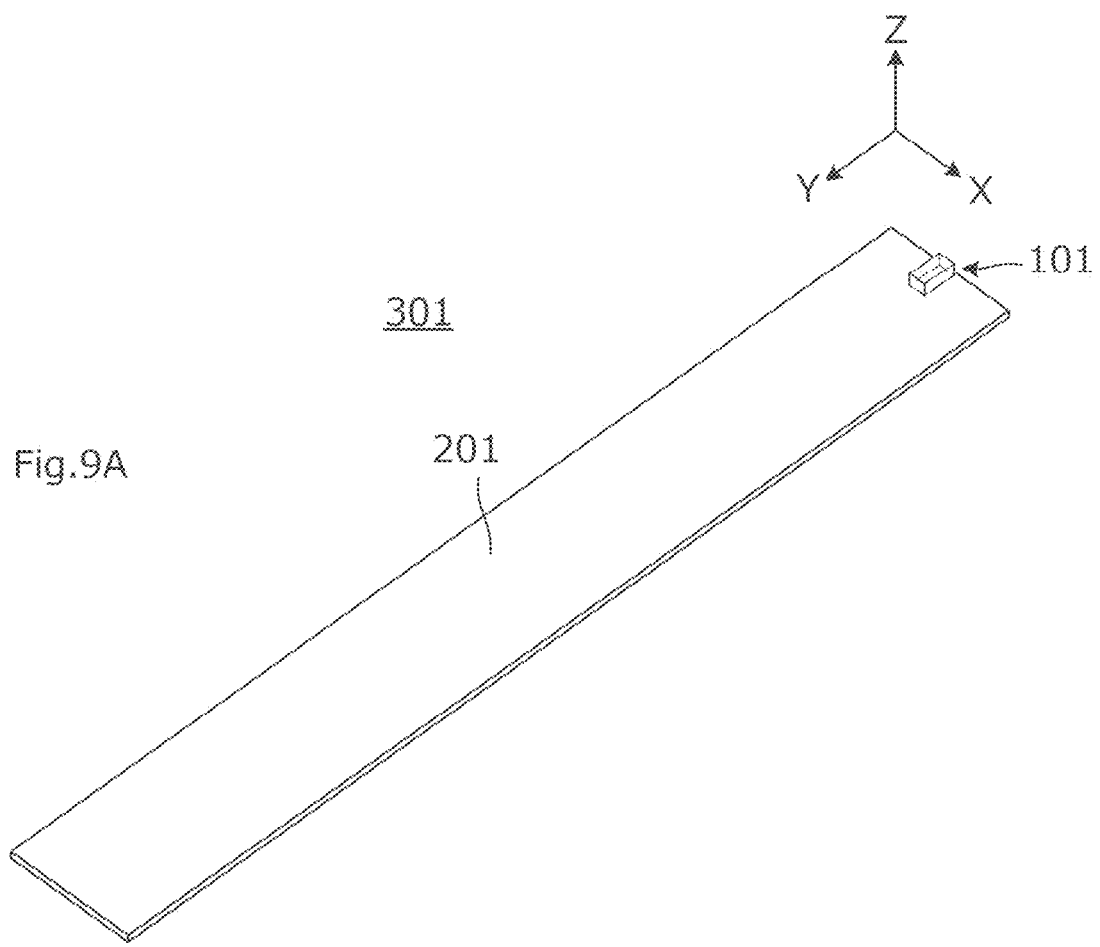
FIG. 9A is a perspective view of an RFID tagged article 301.
Figure 9B:
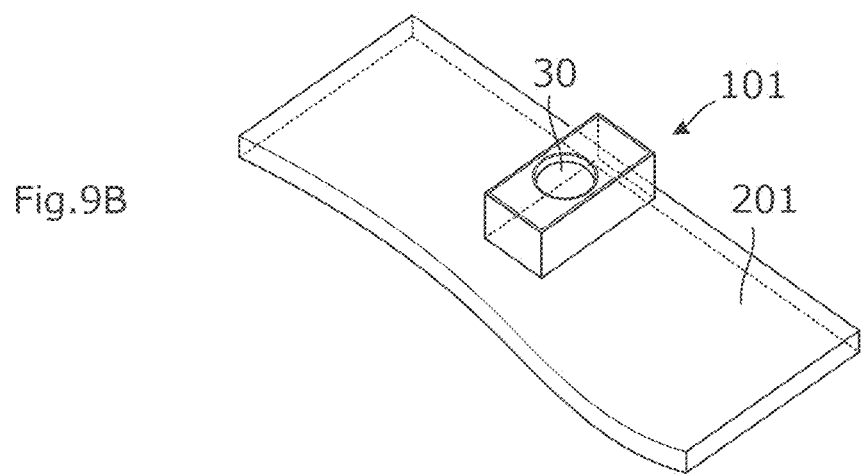
FIG. 9B is an enlarged perspective view of a portion of the RFID tagged article 301 where the RFID tag 101 is attached.

FIG. 9A is a perspective view of an RFID tagged article 301, and FIG. 9B is an enlarged perspective view of a portion of the RFID tagged article 301 where the RFID tag 101 is attached. In this aspect, the RFID tagged article 301 is formed by attaching the RFID tag 101 to the article 201. The article 201 is a metal plate made of aluminum, stainless steel, steel, or the like, for example.

The article 201 is provided with a hole for screwing, and the RFID tag 101 attached with the metal screw 30 screwed into the hole.

Figure 10:
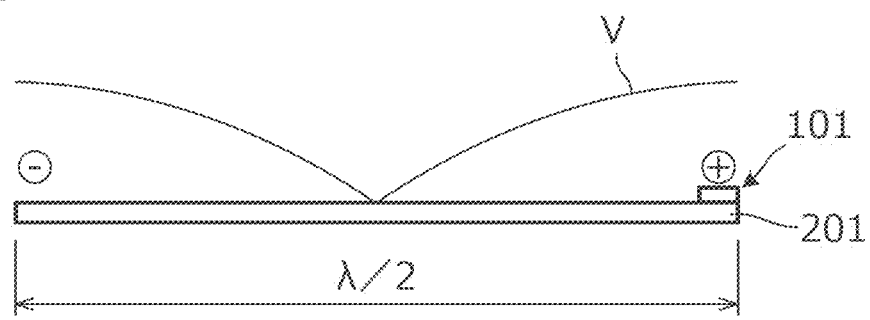
FIG. 10 is a diagram illustrating excitation of the article 201 by the RFID tag 101.

FIG. 10 is a diagram illustrating excitation of the article 201 by the RFID tag 101. FIGS. 11 and 12 are diagrams illustrating directivity of radio waves radiated from the RFID tagged article 301.

In FIG. 10, a curve V indicates a potential distribution on the article 201. In this example, the article 201 has a length corresponding to ½ wavelength in the longitudinal direction thereof, and the RFID tag 101 is attached to the vicinity of one end in the longitudinal direction thereof. Therefore, the article 201 acts like a dipole antenna excited at the open end, with the potential being 0 at the center and being largest at both end portions. Thus, as indicated by plus and minus signs in FIG. 10, the article 201 resonates at ½ wavelength and acts as a radiation element. Thus, the RFID tagged article 301 features higher radiation performance than that achieved by the RFID tag 101 alone.

As illustrated in FIGS. 11 and 12, the excitation of the article 201 causes electromagnetic field radiation in the radiation direction with the longitudinal direction of the article 201 being the center axis.

Figure 13:
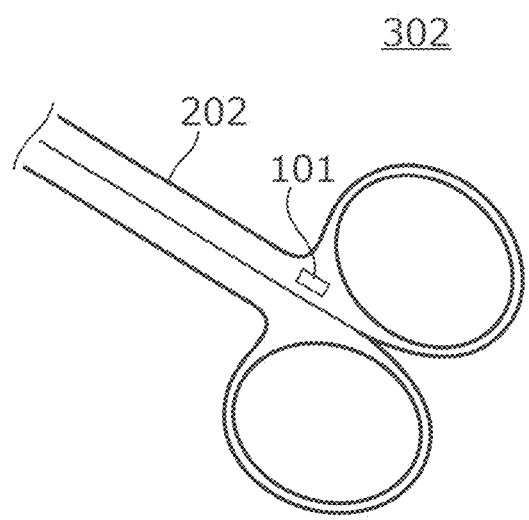
FIG. 13 is a diagram illustrating an example of a small steel article such as hemostatic forceps or medical scissors to which an RFID tag is attached.

Although the article 201 having a simple shape is exemplified in FIG. 9A and the like, the article may be small steel articles such as hemostatic forceps and medical scissors may be used as in the example illustrated in FIG. 13. In this example, the RFID tagged article 302 is formed with the RFID tag 101 screwed to a flat portion of scissors 202.

Second Exemplary Embodiment

In a second embodiment, an RFID tag with a structure of an insertion portion for a metal screw is different from that in the example illustrated in the first embodiment will be described.

Figure 14:
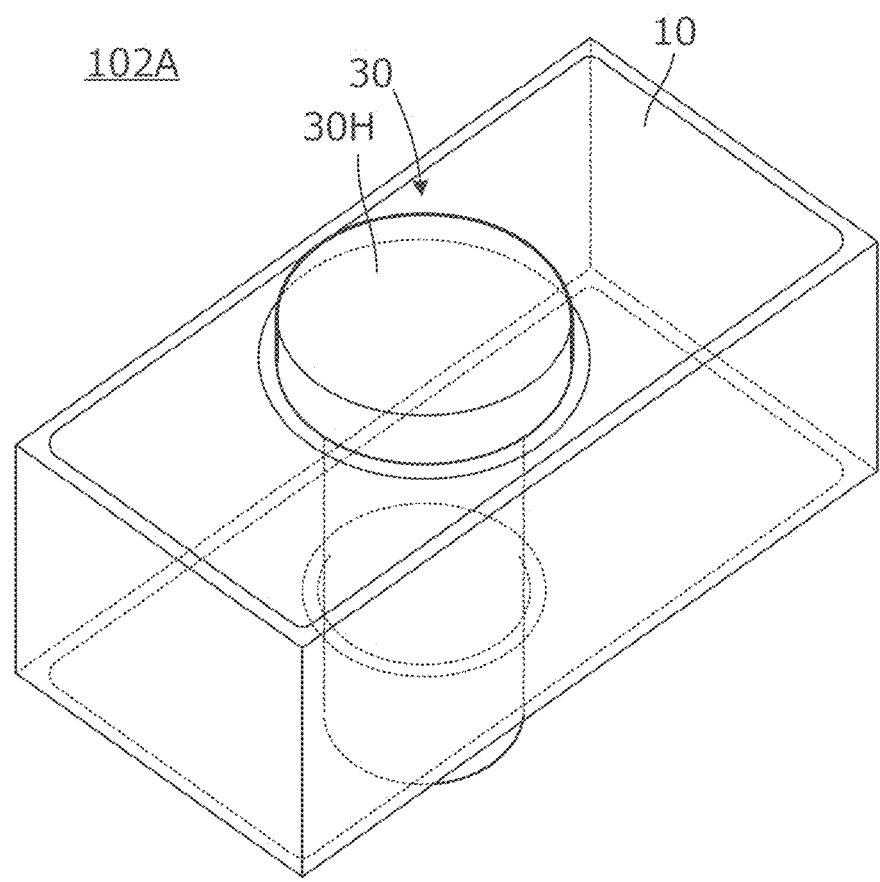
FIG. 14 is a perspective view illustrating a state in which the metal screw 30 is inserted through an RFID tag 102A of a second exemplary embodiment.
Figure 15:
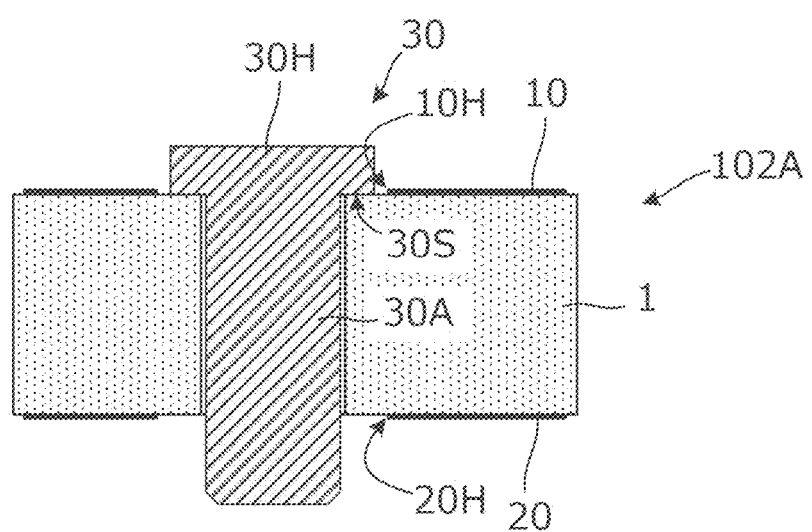
FIG. 15 is a vertical cross-sectional view of the RFID tag 102A.

FIG. 14 is a perspective view illustrating a state in which the metal screw 30 is inserted through an RFID tag 102A of the second embodiment. FIG. 15 is a vertical cross-sectional view of this RFID tag 102A. Illustration of the internal structure of the insulating base material 1 is omitted in FIG. 15.

The internal electrical configuration of the insulating base material 1 of the RFID tag 102A is similar to that of the RFID tag 101 described in the first embodiment. In the RFID tag 102A, no recess is formed in the insulating base material 1, and the head bearing surface 30S of the metal screw 30 comes into contact with the upper surface of the insulating base material 1. Thus, the head 30H of the metal screw 30 protrudes from the insulating base material 1.

The inner diameter of the first opening 10H of the first planar conductor 10 formed on the upper surface of the insulating base material 1 is larger than the outer diameter of the head 30H of the metal screw 30. Therefore, the metal screw 30 is not electrically connected to the first planar conductor 10.

Figure 16:
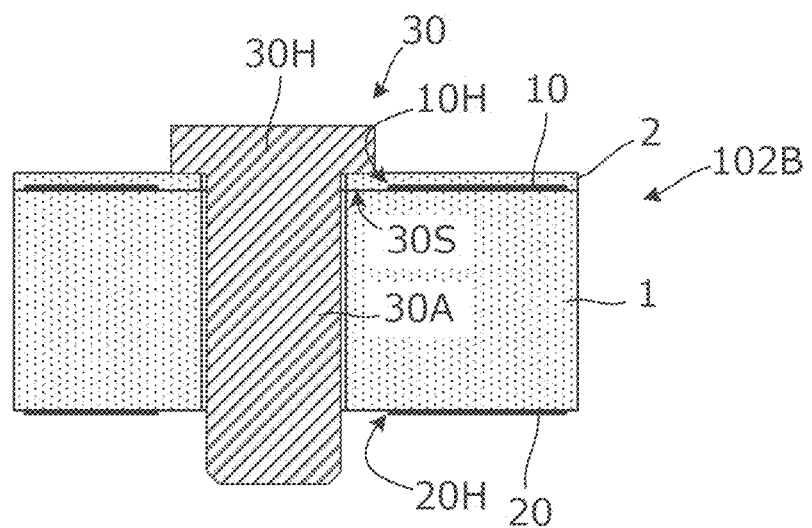
FIG. 16 is a vertical cross-sectional view of another RFID tag 102B of the second exemplary embodiment.

FIG. 16 is a vertical cross-sectional view of another RFID tag 102B of the second embodiment. In FIG. 16, an insulator film 2 covering the first planar conductor 10 is formed on the upper surface of the insulating base material 1. According to an exemplary aspect, the insulator film 2 is, for example, an epoxy resin. In this example, the inner diameter of the first opening 10H of the first planar conductor 10 formed on the upper surface of the insulating base material 1 is smaller than the outer diameter of the head 30H of the metal screw 30. However, the first planar conductor 10 is insulated by the insulator film 2 and thus is not in direct electrical connection with the metal screw in terms of direct current. The electrical configuration inside the insulating base material 1 of the RFID tag 102B is similar to that in the RFID tag 101 described in the first embodiment.

In one aspect, the head 30H of the metal screw 30 can protrude from the insulating base material 1 as described above.

In the first embodiment and the second embodiment, the metal screw 30 is described as an example of a "metal fastener" according to the present disclosure, but it is noted that the exemplary embodiment can be similarly applied to a case where a rivet or a pin is used as the metal fastener. For example, a through hole may be formed in the article, a rivet may be inserted through the through hole and the opening H of the RFID tag, and the RFID tag may be attached to the article by caulking the rivet. As the rivet, a blind rivet or a hollow rivet may be used. If the rivet is usable for a non-through hole, the RFID tag may be attached to the non-through hole portion of the article using the rivet.

Third Exemplary Embodiment

In a third embodiment, some examples of a connection relationship of the RFIC 40, the inductor 51, and the capacitor 52 with respect to the first planar conductor 10 and the second planar conductor 20 will be described.

Figure 17A:
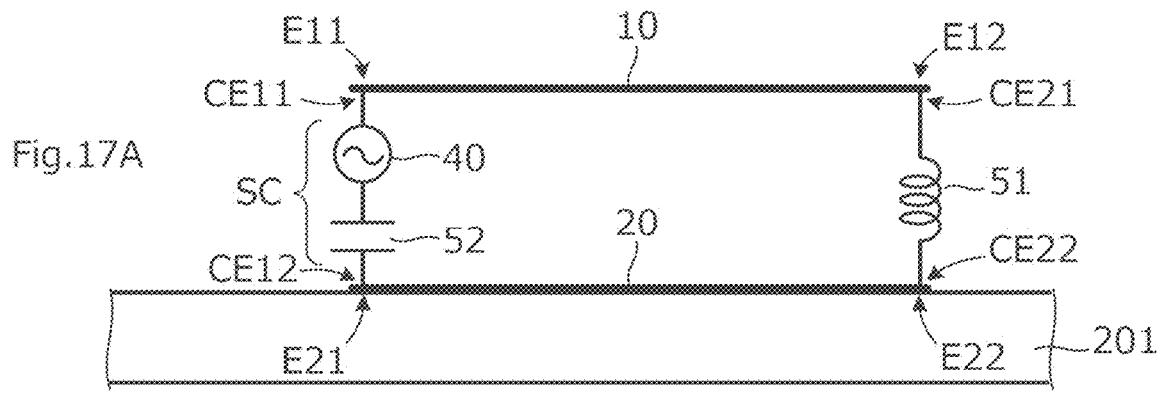
FIGS. 17A, 17B, 17C, and 17D are each a circuit diagram of an RFID tag according to the third exemplary embodiment.

FIGS. 17A, 17B, 17C, and 17D are each a circuit diagram of the RFID tag according to the third embodiment. All of them are illustrated in a state of being attached to an article. The RFID tag illustrated in FIG. 17A is obtained only by changing the expression format of the RFID tag 101 illustrated in FIG. 5 and the like in the first embodiment. Here, illustration of the metal screw and the opening through which the metal screw is inserted is omitted.

Figure 17B:
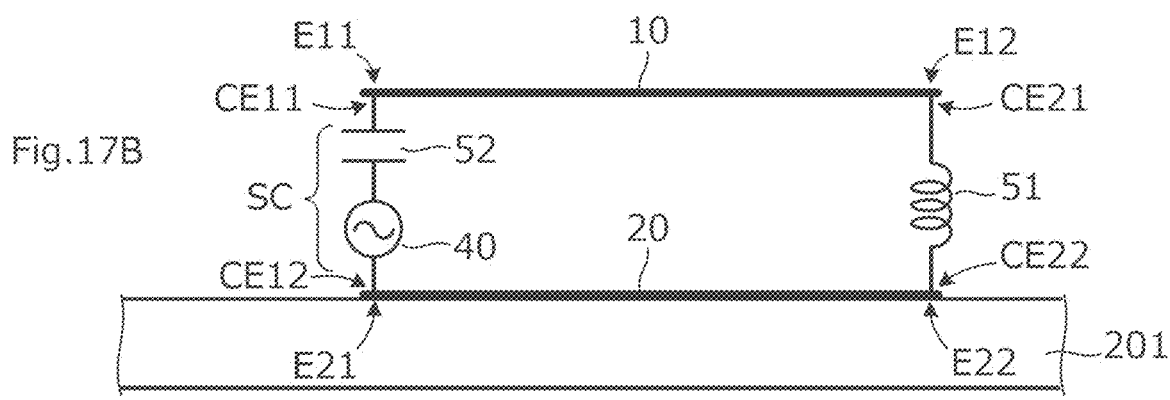

In the RFID tag illustrated in FIG. 17B, the connection relationship of the series circuit SC by the RFIC 40 and the capacitor 52 with respect to the first planar conductor 10 and the second planar conductor 20 is opposite to that in FIG. 17A.

Figure 17C:
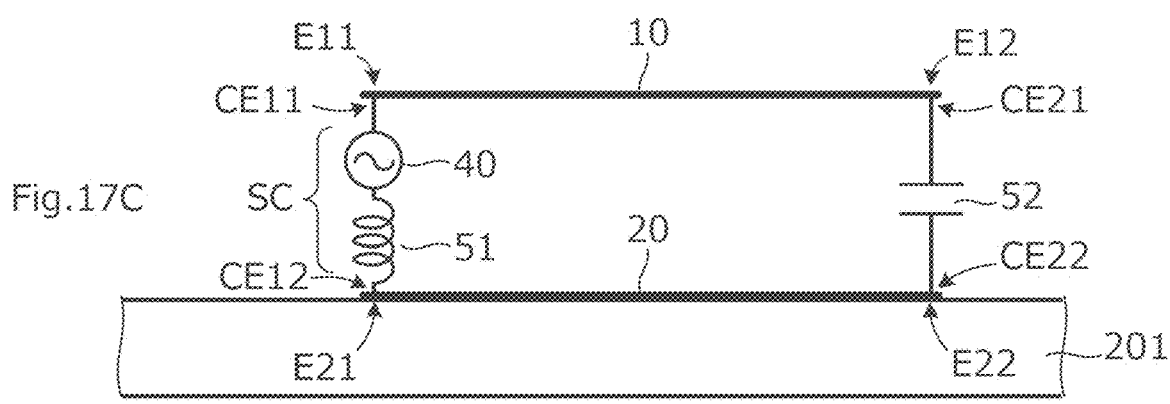

In the RFID tag illustrated in FIG. 17C, the series circuit SC includes the RFIC 40 and the inductor 51, and the first connection end CE11 of the series circuit SC is connected to the first connection portion E11 of the first planar conductor 10. The first connection end CE21 of the capacitor 52 is connected to the second connection portion E12 of the first planar conductor 10. The second connection end CE12 of the series circuit SC is connected to a first connection portion E21 of the second planar conductor 20. The second connection end CE22 of the capacitor 52 is connected to the second connection portion E22 of the second planar conductor 20.

Figure 17D:
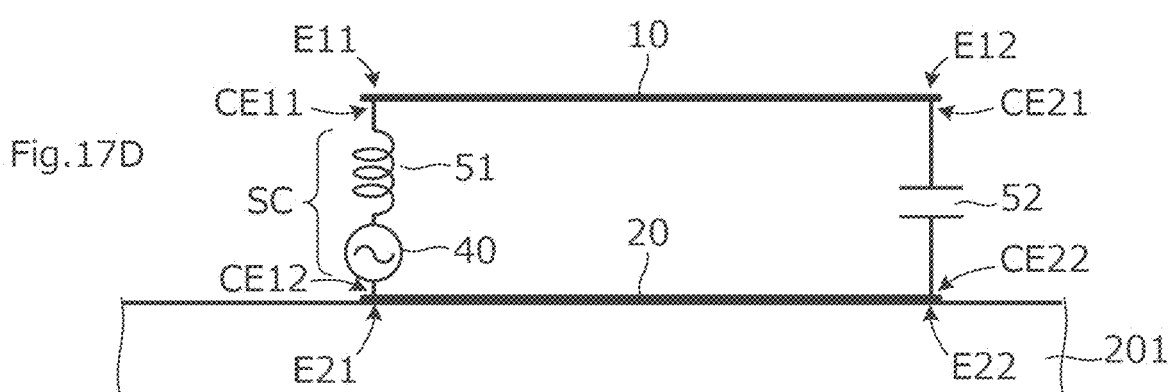

In the RFID tag illustrated in FIG. 17D, the connection relationship of the series circuit SC by the RFIC 40 and the inductor 51 with respect to the first planar conductor 10 and the second planar conductor 20 is opposite to that in FIG. 17C.

Thus, the immediately adjacent element connected in series to the RFIC 40 may be a capacitor or an inductor. One end of the RFIC 40 may be connected to the first planar conductor 10 or the second planar conductor 20.

Finally, it is noted that the above description of the exemplary embodiments is illustrative in all respects and not restrictive. Those skilled in the art can make modifications and changes as appropriate.

For example, in each of the above embodiments, an example in which the second planar conductor 20 is electrically connected to the article 201 is described, but an insulating layer may be interposed between the second planar conductor 20 and the article 201 according to an alternative aspect.

Moreover, in each of the above embodiments, an example in which the first planar conductor 10 is exposed on the surface is described, but the entire outer surface of the RFID tag may be covered with the insulating resin layer according to an alternative aspect. In addition, the first planar conductor 10 may be formed inside the insulating base material.

In each of the above embodiments, an example in which the first planar conductor 10 and the second planar conductor 20 are rectangular is described, but the shape may be a circle, an ellipse, an oval, a rhombus, a parallelogram, a triangle, a pentagon or more, a polygon with six or more corners or the like, according to alternative aspects.

In each of the above embodiments, an example in which the article to which the RFID tag is attached is a metal article is described, but an article having at least a portion whose surface is metal may be provided, and a terminal of the RFID tag may be attached to the metal portion according to an alternative aspect.

It is noted that the position of attachment of the RFID tag to the article is not limited to the end portion in the longitudinal direction of the article, and may be a position away from the end portion in another exemplary aspect.

In the embodiment illustrated in FIG. 9A and the like, an example in which the article acts as a dipole antenna is described, but the dimension of the article or the metal portion in the predetermined axis direction is not limited to the ½ wavelength of the communication frequency in other exemplary aspects.

In each of the above embodiments, an example in which the capacitor 52 and the inductor 51 are chip components is described, but these may be formed by conductor patterns in alternative aspects.

Furthermore, the communication frequency is not limited to the 900 MHz band, and other frequency bands, for example, a 2.45 GHz band can be similarly employed.

| REFERENCE SIGNS LIST | |
|---|---|
| CE11 | first connection end |
| CE12 | second connection end |
| CE21 | first connection end |
| CE22 | second connection end |
| CP11, CP12 | current path |
| CP21, CP22 | current path |
| E11 | first connection portion of first planar conductor |
| E12 | second connection portion of first planar conductor |
| E21 | first connection portion of second planar conductor |
| E22 | second connection portion of second planar conductor |
| H | opening |
| SC | series circuit |
| V11, V12 | via conductor |
| V21, V22 | via conductor |
| V31, V32 | via conductor |
| 1 | insulating base material |
| 1A | first insulating base material |
| 1B | second insulating base material |
| 1C | third insulating base material |
| 2 | insulator film |
| 2M1 | space portion |
| 2M2 | space portion |
| 3M | space portion |
| 3R | recessed |
| 10 | first planar conductor |
| 10F | magnetic flux releasing opening |
| 10H | first opening |
| 20 | second planar conductor |
| 20H | second opening |
| 30 | metal screw |
| 30A | shaft of metal screw |
| 30H | head of metal screw |
| 30S | head bearing surface of metal screw |
| 40 | RFIC |
| 41 | communication circuit |
| 42 | capacitor |
| 51 | inductor |
| 52 | capacitor |
| 101, 102A, 102B | RFID tag |
| 201 | article |
| 202 | scissors |
| 301, 302 | RFID tagged article |

The invention claimed is:

1. An RFID tag comprising:
a first planar conductor having a first opening;
a second planar conductor partially or entirely facing the first planar conductor and having a second opening;
an RFIC;
a capacitor; and
an inductor,
wherein the RFIC, the capacitor, and the inductor form a part of a current closed loop,
wherein the first and second openings have respective sizes such that the first and second openings do not contact a metal fastener that is inserted into the first and second openings,
wherein the first opening is located closer to a center than to an edge of the first planar conductor, and
wherein the second opening is located closer to a center than to an edge of the second planar conductor.

2. The RFID tag according to claim 1, wherein each of the capacitor and the inductor have a first connection end and a second connection end.

3. The RFID tag according to claim 2, wherein the RFIC and the capacitor are connected in series without the first and second planar conductors disposed in between to form a series circuit having a first connection end and a second connection end.

4. The RFID tag according to claim 3, wherein a first connection portion of the first planar conductor that is connected to the first connection end of the series circuit and a second connection portion of the first planar conductor that is connected to the first connection end of the inductor are respectively located near sides of the first planar conductor opposite to each other or are located near corners of the first planar conductor opposite to each other.

5. The RFID tag according to claim 4, wherein a first connection portion of the second planar conductor that is connected to the second connection end of the series circuit and a second connection portion of the second planar conductor that is connected to the second connection end of the inductor are respectively located near sides of the second planar conductor opposite to each other or are located near corners of the second planar conductor opposite to each other.

6. The RFID tag according to claim 3, wherein a first connection portion of the first planar conductor that is connected to the first connection end of the series circuit and a second connection portion of the first planar conductor that is connected to the first connection end of the capacitor are respectively located near sides of the first planar conductor opposite to each other or are located near corners of the first planar conductor opposite to each other.

7. The RFID tag according to claim 6, wherein a first connection portion of the second planar conductor that is connected to the second connection end of the series circuit and a second connection portion of the second planar conductor that is connected to the second connection end of the capacitor are respectively located near sides of the second planar conductor opposite to each other or are located near corners of the second planar conductor opposite to each other.

8. The RFID tag according to claim 5, wherein a length of a current path from the first connection portion of the first planar conductor to the second connection portion of the first planar conductor is ⅛ wavelength or less at a frequency at which the first planar conductor and the second planar conductor operate as radiation elements, a length of a current path from the first connection portion of the second planar conductor to the second connection portion of the second planar conductor is ⅛ wavelength or less at the frequency.

9. The RFID tag according to claim 1, wherein the first opening is located at a node of a radiation electric field generated in the first planar conductor, and the second opening is located at a node of a radiation electric field generated in the second planar conductor.

10. The RFID tag according to claim 1, wherein the first opening is located at the center of the first planar conductor or located closer to the center than to the edge of the first planar conductor, and the second opening is located at the center of the second planar conductor or located closer to the center than to the edge of the second planar conductor.

11. The RFID tag according to claim 1, wherein the first planar conductor and the second planar conductor are supported by an insulating base material.

12. The RFID tag according to claim 11, wherein the insulating base material has a recess in which at least a head bearing surface of the metal fastener is buried to be at a height lower than the first planar conductor.

13. The RFID tag according to claim 11, wherein the insulating base material has at least one space constructed to avoid interference with at least one of the RFIC, the capacitor and the inductor.

14. The RFID tag according to claim 13, wherein a resin is disposed in the at least one space.

15. The RFID tag according to claim 1, wherein the first opening is disposed in a center of the first planar conductor and the second opening is disposed in a center of the second planar conductor.

16. An RFID tag comprising:
a first planar conductor having a first opening extending therethrough;
a second planar conductor facing the first planar conductor and having a second opening extending therethrough; and
a current loop that includes an RFIC, a capacitor and an inductor,
wherein the first and second openings have respective diameter sizes such that respective sides of the first and second openings do not contact a metal fastener, when the metal fastener is inserted through the first and second openings to secure the RFID tag to an article.

17. The RFID tag according to claim 16, wherein the first opening is located closer to a center than to a side edge of the first planar conductor, and the second opening is located closer to a center than to a side edge of the second planar conductor.

18. The RFID tag according to claim 16, wherein the first opening is disposed in a center of the first planar conductor and the second opening is disposed in a center of the second planar conductor.

19. The RFID tag according to claim 16,
wherein the first planar conductor and the second planar conductor are supported by an insulating base material, and
wherein the insulating base material has a recess in which at least a head bearing surface of the metal fastener is buried to be at a height lower than the first planar conductor.

20. An RFID tagged article comprising:
an article; and
an RFID tag that includes:
a first planar conductor having a first opening;
a second planar conductor partially or entirely facing the first planar conductor and having a second opening;
an RFIC;
a capacitor; and
an inductor,
wherein the RFIC, the capacitor, and the inductor form a part of a current closed loop,
wherein the first and second openings have respective sizes such that the first and second openings do not contact a metal fastener that is inserted into the first and second openings,
wherein the first opening is located closer to a center than to an edge of the first planar conductor,
wherein the second opening is located closer to a center than to an edge of the second planar conductor, and
wherein the RFID tag is attached to the article using the metal fastener inserted into the first and second openings of the RFID tag.

* * * * *